(12) United States Patent
Ivankovic

(10) Patent No.: US 7,542,251 B2
(45) Date of Patent: Jun. 2, 2009

(54) AUTO-PROTECTED POWER MODULES AND METHODS

(75) Inventor: Mladen Ivankovic, Burlington (CA)

(73) Assignee: Carter Group, Inc., Windermere, FL (US)

( * ) Notice: Subject to any disclaimer, the term of this patent is extended or adjusted under 35 U.S.C. 154(b) by 605 days.

(21) Appl. No.: 10/435,694

(22) Filed: May 9, 2003

(65) Prior Publication Data

US 2004/0223271 A1 Nov. 11, 2004

(51) Int. Cl.
*H02H 7/00* (2006.01)
(52) U.S. Cl. .......................................... 361/23; 361/75
(58) Field of Classification Search .................. 361/23, 361/75
See application file for complete search history.

(56) References Cited

U.S. PATENT DOCUMENTS

| | | | | |
|---|---|---|---|---|
| 3,742,303 A | * | 6/1973 | Dageford | 361/22 |
| 4,751,449 A | * | 6/1988 | Chmiel | 318/786 |
| 5,023,527 A | * | 6/1991 | Erdman et al. | 318/254 |
| 5,262,704 A | * | 11/1993 | Farr | 318/434 |
| 5,574,608 A | * | 11/1996 | Fukuoka | 361/23 |
| 5,990,640 A | * | 11/1999 | Dwyer et al. | 318/254 |
| 6,611,117 B1 | * | 8/2003 | Hardt | 318/254 |

OTHER PUBLICATIONS

"'Omnifet II': Fully Autoprotected Power MOSFET," ST Microelectronics, Feb. 2003.

* cited by examiner

*Primary Examiner*—Stephen W Jackson
(74) *Attorney, Agent, or Firm*—Haynes and Bone, LLP

(57) ABSTRACT

A linear power controller system may be implemented that includes locked-rotor protection circuitry that is primarily assembled using analog circuit components. The locked rotor protection circuitry may be part of a power module in the system. The power module may be a switched power source that includes temperature circuit. A control loop may be established in the system to maintain the voltage across a motor that is driver by the power module. Circuitry for establishing a close loop with a motor may be positioned in a control head in the system or in a power module in the system. Temperature protection circuitry may be integrated into a current source in the power module to provide automatic thermal shutdown of the current source. The linear power module may specifically include analog circuitry that is arranged to establish a control loop with the motor.

35 Claims, 4 Drawing Sheets

AUTO-PROTECTED POWER MODULES AND METHODS

BACKGROUND OF THE INVENTION

The present invention is generally related to control systems for variable speed electric motors, and more particularly, to power modules in such control systems.

Presently, electronic controllers are typically designed for 12 V or 24 V electrical systems such as those used in automotive applications. Electronic controllers in automobiles are typically attached to dashboards, seat bottoms, rear side of the passenger compartment, or the like by being screwed into designated place(s).

Present-day electric motors, such as those used in heating, ventilating, and air conditioning (HVAC) systems of automobiles, are controlled mainly using switch-mode technology, in which a fixed DC power supply is switched on and off with a predetermined switch frequency and pulse width modulated switch-on time as needed to control the motor speed. In the United States, the motor control technology has been implemented primarily by use of a resistive divider (e.g., blower resistor) or by the switch-mode pulse width modulation (PWM). A resistive divider operates by modulating the power provided to the electric motor by a constant or adjustable amount, resulting in a choppy or stepwise level of control.

Alternatively, some use has been made in Europe of a type of linear motor controller with speed set-point inputs in PWM type controller, e.g., the linear current threshold motor controllers shown in U.S. Pat. No. 5,781,385 to Permuy issued on Jul. 14, 1998 or the linear speed controller through motor r.p.m. feedback control shown in U.S. Pat. No. 5,747,956 to Lamm issued May 5, 1998. A PWM set-point signal is used directly for driving the controller switch device through a low-pass filter. A linear electric motor controller generally works by directly controlling the motor speed by setting the voltage feeding to the electric motor. The speed of the electric motor has a linear relationship with the voltage supplied to the motor, hence the term "linear." These systems tend to be characterized by an undesirably large latency period, i.e., the period between detection and correction of the desired motor speed. In some known systems, digital circuits have been implemented to provide a linear motor controller. Examples of such systems are illustratively shown in U.S. Patent Publication No. US 2003/0063900 A1 of Wang et al., which is hereby incorporated herein in its entirety by express reference thereto.

Known techniques for implementing linear power modules or implementing systems that use linear power modules (e.g., HVAC systems) have sometimes been found to be inadequate in suitably meeting various needs such as efficiency, noise reduction, simplicity in design, cost of production, responsiveness, etc.

SUMMARY OF THE INVENTION

In accordance with the principles of the present invention, variable speed motor power modules for powering an electric direct current variable speed motor may be provided. The power module may be configured to capitalize on the use of analog circuit components in implementing power module functionality. In some circumstances, such techniques may enhance the performance, simplicity, and manufacturing (e.g., assembly of analog components on a printed circuit board may be less expensive than fabricating an integrated circuit). If desired, however, the power modules may use combinations of digital and analog components. If such combinations are used, it may be desired to primarily use the analog circuit components in assembling the power module.

In some embodiments, the power module may be a "dummy" power module, except, for example, that it may include protection circuitry. The power module may be a "dummy" power module because it may not include circuitry for handling a feedback from the motor and may not include circuitry for adjusting the power supplied to the motor to adjust for battery voltage fluctuations based on the feedback. Circuitry that handles a feedback from the motor and adjusts the power supplied to the motor based on the feedback is sometimes considered to be a control loop. In some embodiments, the power module includes circuitry to form a control loop with the electric motor that it drives (e.g., with signals at the opposing poles of the motor). In other embodiments, the power module does not include the control loop and only acts as a switched current source (which may also include some automatic protection features). For example, a control head in the system may be used to establish a control loop for use in the motor control system, thereby avoiding the need to include certain types of specialized circuitry in the power module, e.g., an application specific integrated circuit or a portion thereof.

A power module may include driver circuitry and locked rotor protection circuitry. The driver circuitry may be configured to receive a variable input signal and may include a voltage-controlled current source for driving the motor responsive to variations in the input signal. The power module may also include locked-rotor protection circuitry that may be assembled using analog circuit components. The analog circuit components may be configured to block the input signal to the driver circuitry for a set period of time in response to an electrical condition that is caused as a result of a locked rotor condition in the motor.

In some embodiments, the driver circuitry may include temperature protection circuitry that is coupled to the voltage controlled current source to protect the voltage controlled current source from operating when the current source has a temperature that is above a certain temperature (e.g., a thermal shut down temperature), which may for example be specified by the manufacturer of the current source. The point of action of the temperature protection circuitry may also have been set by the manufacturer of the current source.

The voltage controlled current source may be a discrete semiconductor circuit component (e.g., a packaged die) within which the temperature protection circuitry is integrated. In some embodiments, one may consider the driver circuitry to simply be a discrete semiconductor circuit component that includes the temperature protection circuitry as part of the component. An auto-protected power semiconductor device may be such a discrete semiconductor circuit component. An auto-protected power semiconductor device may, among other things, contain the combination of a voltage-controlled current source and thermal protection circuitry for thermal protection. An auto-protected power semiconductor device may for example be an auto-protected metal oxide semiconductor field effect transistor. The auto-protected metal oxide semiconductor field effect transistor may for example be one that is considered to be in the category of fully auto-protected power MOSFETs, or in the category of temperature protected MOSFETs.

In instances where a current-source-integrated temperature protection circuitry is being used (e.g., an auto-protected power MOSFET), the locked rotor protection circuitry may be configured in connection with the driver circuitry to block the input signal of the current source (e.g., the input of the drain current of a MOSFET) in response to an electrical condition that is caused as a result of the temperature protection circuitry shutting down the current source. The condition that may occur as a result of the shutdown, which is in turn a result of a locked rotor condition, may be a voltage spike that is experience at the driver circuitry in response to the shut down.

The temperature protection circuitry of the current source may be of the kind that is strictly temperature controlled such that the current source is returned to operation when the current source has a temperature (e.g., a junction temperature) that is within the normal operating temperature of the current source (e.g., as specified in a data sheet or otherwise). Since, it is possible and sometimes likely that the current source may return to an operating temperature too quickly after thermal shutdown occurs, the locked rotor protection circuitry may be implemented to keep the current source from returning to operation for a set period of time after thermal shutdown occurs even if during that period of time the temperature returns to a normal operating range.

A "dummy" linear power module that includes a current source that itself has automatic thermal protection and further includes circuitry for locked rotor protection may sometimes be referred to as a temperature power module.

A resistor-capacitor combination (e.g., series connected resistor-capacitor combination) may be configured in the locked protection circuitry to set the period of time for which the locked rotor protection circuitry prevents the driver circuitry from operating (e.g., stops the flow of the input signal from a control head).

In some embodiments, the input signal to the power module and the driver circuitry may be a DC voltage signal. The driver circuitry is configured to be responsive to the DC voltage input signal. In such embodiments, the responsibility of providing a control loop may be attributed to the control head. The power module may receive a DC input signal from the control head. The input signal or a signal representative of the input signal may be received by the voltage-controlled current source in the power module r and is used by the current source to generate a current based on the received signal.

In some embodiments, the power module may receive an input signal that is a pulse-width-modulated voltage signal to operate the motor. In such embodiments, the power module may include circuitry that converts the pulse-width-modulated signal to a DC signal and may include circuitry for forming a control loop with the motor.

If desired, the power module may be implemented without using an application specific integrated circuit. Thus, the power module would operate as a discrete unit without internal routing of signals through an application specific integrated circuit. In some embodiments, the power module may be configured without the use of any digital logic components such as state machines, logic gates, digital logic switches, etc. This would take advantage of benefits that analog circuitry can sometimes provide over digital circuitry.

The power module may be implemented in a control system or method for operating a variable speed electric current. The power module may be specifically for an HVAC system having a control head. For example, the control head may be configured to be responsive to user-motor speed selections, configured to form a control loop with a motor that provides a feedback signal, and further configured to generate a DC signal based on the user speed selection and the feedback signal. The control head may be coupled to a power module such as an appropriate one of those illustratively described herein. The power module may receive the DC signal as the input signal of the power module.

In some embodiments, the power module may for example receive a pulse-width modulated signal from the control head that the power module converts to a DC signal and uses in combination with a control loop (e.g., in this case, the control head is not used to form the control loop) to supply an appropriate current to the motor.

If desired, the power module may be positioned near the motor or a fan powered by the motor to provide cooling to the power module. Other circuitry such as the control head may be remotely located, e.g., a separated distance, away from the power module because the control head may not be capable of withstanding the environmental conditions (e.g., heat) in which the power module is located.

A linear power module may include analog circuitry for establishing a control loop with the motor. The circuitry for forming the control loop may be substantially only made of analog circuit components. In some embodiments, a mix of digital and analog circuit components may be employed. A linear power module with such control loop circuitry may include a voltage-controlled current source that is a discrete semiconductor device that includes temperature protection circuitry integrated therein. In one particular embodiment of the closed loop circuitry, differential amplifier circuitry receives feedback from the motor and generates an output signal in response to an appropriate condition (e.g., a voltage differential across the motor that is outside of a particular range) is sensed. The control loop circuitry may apply a low pass filter to the output signal and feed the filtered signal to an integration circuitry that is used to adjust the control signal of the current source. The control loop circuitry may be considered to provide a local control loop as opposed to a control loop that is formed using a control head.

BRIEF DESCRIPTION OF THE DRAWINGS

Further features of the invention, its nature and various advantages will be more apparent from the following detailed description, taken in conjunction with the accompanying drawings in which like reference characters refer to like parts throughout, and in which.

DETAILED DESCRIPTION OF PREFERRED EMBODIMENTS

Figure 1:
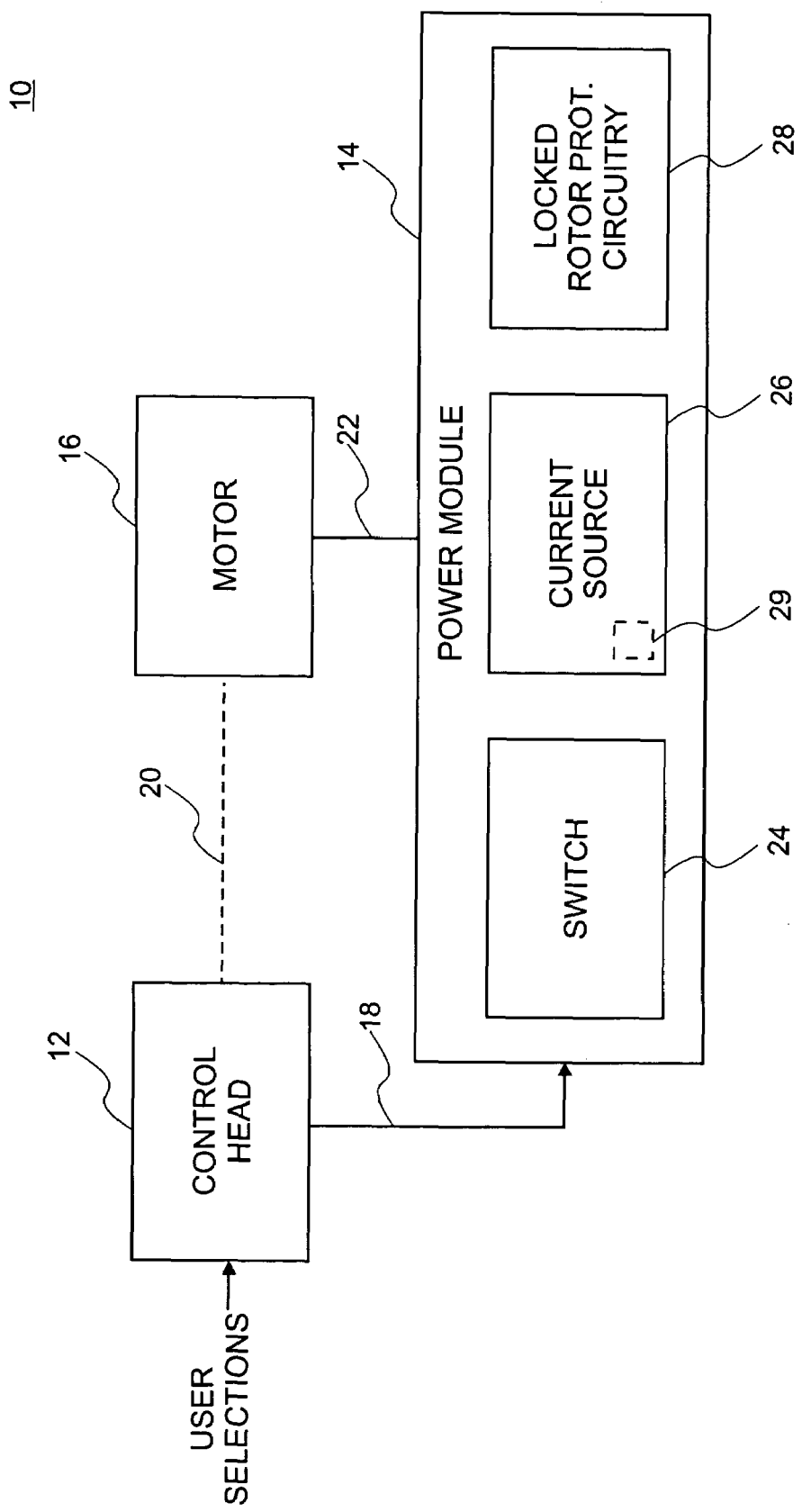
FIG. 1 is a functional block diagram of an illustrative system for controlling an electric motor in accordance with one embodiment of the present invention.

Analog circuit arrangements may be configured to provide a power module that may provide advantages in operation, manufacturing, efficiency, and technical simplification. With reference now to FIG. 1, system 10 may be a system for operating a variable speed electric motor such as an HVAC system of an automobile. System 10 may include control head 12, power module 14, and motor 16. Motor 16 may include circuitry in addition to an electric motor that is incorporated therein. Control head 12 may be an electronic controller that is configured to receive user selections with respect to the motor speed of motor 16. Typically, discrete stepwise userselectable speed settings are available. A control head or electric controller is a typical part of conventional control systems for electric motors and are known to those skilled in the art.

Control head 12 is shown to have connection 20 with motor 16 (e.g., an electrical connection that does not pass through power module 14). Dashed lines are shown for connection 20 to indicate that in some embodiments, system 10 is configured without connection 20. Connection 20 may be representative of one or more signals lines. Connection 20 may be implemented together with motor 16 and control head 12 to form a control loop that provides a feedback signal from motor 16 to control head 12. Control head 12 may use the feedback signal to regulate how much instantaneous current is supplied to motor 16 to achieve a desired voltage across the motor (e.g., to attain constant motor speed, to maintain a linear relationship between the control signal and the supply current). Control head 12 may have control connection 18 that may provide a control signal to power module 14. The control signal may for example be a DC voltage signal that is generated by control head 12 based on user-motor speed selections and feedback received by control head 12 from motor 16. In embodiments where a control loop is established between control head 12 and motor 16, power module 14 may simply be a switchable power source "a dummy power module" that simply generates power for motor 16 without exercising intelligence regarding what level of power is appropriate for motor 16 under current operating conditions. Connection 18 may include one or more signal lines.

In other embodiments, control head 12 may be formed without circuitry for establishing a control loop with motor 16. In such instances, power module 14 may include circuitry for forming a control loop with motor 16 via connection 22. Connection 22 may be one or more signal lines. The control loop may for example be provided between motor 16 and power module 14 for the same purposes as mentioned above. In embodiments where the control loop is supported by or formed with power module 14, the control signal from control head 12 may be a pulse-width-modulated signal or other type of signal (e.g., a DC signal) that is generated by control head 12. A pulse-width modulated signal should for example be indicative of a motor speed setting.

Power module 14 may include switch 24, current source 26, and locked rotor protection circuitry 28. The output of current source 26 may have a linear relationship with respect to a DC voltage control signal that is applied to it. Power module 14 may be configured to feed a driving current to motor 16 via connection 22. The driving current may be one that is sufficient to run motor 16. Current source 26 may be a current source circuit or circuit component such as a power semiconductor device (e.g., a MOSFET, a temperature protected FET, etc.) that generates a current feed for driving motor 16. Current source 26 may be a voltage controlled current source that is responsive to a control signal from control head. Locked rotor protection circuitry 28 may be electrically connected with current source 26 and if desired, may also be electrically connected to motor 16 via connection 22. Locked rotor protection circuitry may be triggered to stop current source 26 from operating in response to an electrical condition that is caused as a result of a locked rotor condition (e.g., an over-current, a voltage spike caused as a result of shutting off the current source, etc.)

Switch 24 may be configured to selectively pass an input signal to current source 26. The input signal may be the control signal from control head 12. Locked rotor protection circuitry 28 may be coupled to switch 24 to select whether an input signal will be provided to current source 26. Using switch 24, which may sometimes be considered to be part of the locked rotor protection circuitry or part of circuitry related to current source 26, locked rotor protection circuitry 28 may stop current source 26 from operating. If desired, power module 14 may be configured with substantially only analog circuit components rather than digital circuitry components. If desired, current source 26 may include temperature protection circuitry 29 that is part of current source 26 and or integrated into current source 26 (e.g., integrated as part of the power semiconductor device). Temperature protection circuitry 29 may shut down current source 26 when the temperature of current source 26 is above a specified limit (e.g., a thermal shutdown limit). Current source 26 may be an analog circuit component.

Figure 2:
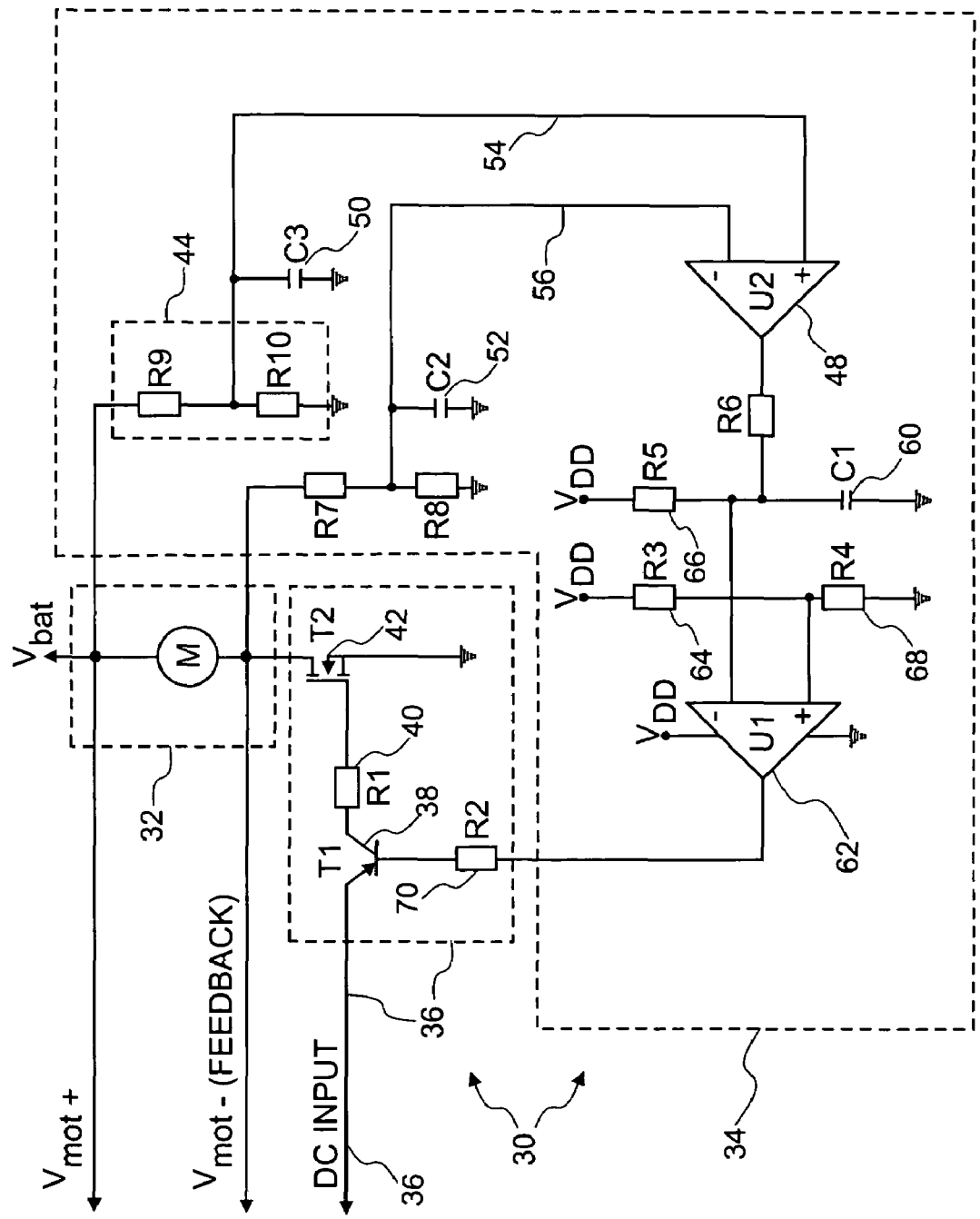
FIG. 2 is a circuit diagram of an illustrative power module that includes a temperature protected FET for a current source in accordance with one embodiment of the present invention.

One embodiment comprising a temperature protected FET is illustratively shown in FIG. 2. FIG. 2 shows power module 30 for driving motor 32. Power module 30 is shown to include locked rotor protection circuitry 34 and current source circuitry 36. As shown, power module 30 is configured without circuitry for forming a control loop with motor 32, which in this case would be provided by a control loop between motor 32 and circuitry in a control head (e.g., control head 12 of FIG. 1). The control head, thus, provides power module 30 with a DC input signal on line 36. The input signal may be provided to switch 38 (e.g., a semiconductor switch, a switched amplifier, a BJFET, etc.) that allows the input signal to pass through resistor 40 to apply the input signal to voltage-controlled current source 42. Resistor 40 may be implemented to dampen the current flowing into current source 42. In this embodiment, current source 42 is intended to be a temperature protected FET even though the circuit diagram uses the standard symbol for a MOSFET. Temperature protected FETs are known to those skilled in the art. Companies such as Phillips are known to produce temperature protected FETs. One type of temperature protected FET is an autoprotected power MOSFET such as the OMNIFET II produced by ST Microelectronics. Some of the details of OMNIFET II are described in an ST Microelectronics datasheet dated February 2001 and entitled OMNIFET II: FULLY AUTOPROTECTED POWER MOSFET, which is hereby incorporated herein by reference in its entirety.

The commercially available OMNIFET II includes linear current limitation, thermal shut down, short circuit protection, integrated clamp, low current drawn from input pin, diagnostic feedback through input pin, ESD protection, direct access to the power MOSFET gate (analog driving), and compatibility with standard power MOSFETs. These devices are designed in STMicroelectronics VIPower MO-3 Technology are intended for replacement of standard power MOSFETS from DC up to 50 KHz applications. Built in thermal shutdown, linear current limitation, and overvoltage clamp protect the chip in harsh environments. Fault feedback can be detected by monitoring the voltage at the input pin.

During normal operation, the input pin is electrically connected to the gate of the internal power MOSFET through a low impedance path. The device then behaves like a standard power MOSFET and can be used as a switch from DC up to 50 KHz. The only difference from the user's standpoint is that a small DC current $I_{ISS}$ (typically 100 μA) flows into the input pin in order to supply the internal circuitry.

The device integrates:

Overvoltage clamp protection: internally set at 45V, along with the rugged avalanche characteristics of the Power MOSFET stage give this device unrivaled ruggedness and energy handling capability. This feature is mainly important when driving inductive loads.

Linear current limiter circuit: limits the drain current $I_D$ to $I_{lim}$ whatever the input pin voltages. When the current limiter is active, the device operates in the linear region, so power dissipation may exceed the capability of the heatsink. Both case and junction temperatures increase, and if this phase lasts long enough, junction temperature may reach the over-temperature threshold $T_{jsh}$.

Overtemperature and short circuit protection: these are based on sensing the chip temperature and are not dependent on the input voltage. The location of the sensing element on the chip in the power stage area ensures fast, accurate detection of the junction temperature. Overtemperature cutout occurs in the range 150 to 190° C., a typical value being 170° C. The device is automatically restarted when the chip temperature falls of about 15 ° C. below shut-down temperature.

Status feedback: in the case of an overtemperature fault condition ($T_j > T_{jsh}$), the device tries to sink a diagnostic current $I_{gf}$ through the input pin in order to indicate fault condition. If driven from a low impedance source, this current may be used in order to warn the control circuit of a device shutdown. If the drive impedance is high enough so that the input pin driver is not able to supply the current $I_{gf}$, the input pin will fall to 0 V. This will not, however, affect the device operation: no requirement is put on the current capability of the input pin driver except to be able to supply the normal operation drive current $I_{ISS}$. Additional features of this device are ESD protection according to the Human Body model and the ability to be driven from a TTL Logic circuit.

When operating, a drive current is fed to motor 32 that is directly responsive to or representative of the input signal on line 36. As mentioned above, in this embodiment, current source 42 includes temperature protection circuitry that automatically shuts down current source 42 when current source 42 has a temperature that is above a specified thermal shut-down temperature. The temperature may be obtained using temperature sensors that for example are indicative of a junction temperature of current source 42. In addition, power module 30 may include locked rotor protection circuitry that is configured to stop the flow of input signals to current source 42 in response to a particular electrical condition that is caused as a result of a locked rotor condition.

For example, a locked rotor condition may cause the temperature of current source 42 to rise above a thermal shutdown temperature. The temperature may rise for example because air flow caused by the motor used to cool current source 42 may not be flowing due to a locked rotor condition. Once the temperature is above the thermal shutdown temperature of current source 42, the internal temperature protection circuitry of current source 42 automatically shuts down current source 42 until the temperature of current source 42 returns to a temperature below the thermal shutdown temperature. Shutting down current source 42 while powering motor 32 may cause a reverse voltage spike across current source 42. Locked rotor protection circuitry 34 may be configured to be triggered by the voltage spike to stop the flow of the input signal in power module 30 for a set period of time.

The electrical condition, which in this case is the voltage spike, may be sensed by locked rotor protection circuitry 34 using voltage dividers 44 and 46 and using differential amplifier 48. Capacitors 50 and 52 may be implemented for filtering purposes. Each voltage divider 44 and 46 may be connected to an opposing electrical pole of motor 32 to generate a corresponding signal on lines 54 and 56 that is representative of the voltage across the different poles of motor 32. Differential amplifier 48 receives signals from lines 54 and 56 and compares the signals to indicate whether the electrical condition exists. If the electrical condition is found to exist, differential amplifier 48 provides an output signal that is fed to resistor 58 and is used to charge capacitor 60. Differential amplifier 62 is configured to be normally on based on the arrangement of resistors 64, 66, and 68 that are arranged between $V_{DD}$ and ground in between differential amplifier 62 and differential amplifier 46. When the electrical condition of interest occurs, the output of differential amplifier 48 causes differential output 62 to shut down its output. The output of differential amplifier 48 may also be sufficient to charge capacitor 60 and the charge on capacitor 60 may keep the differential across the inputs of differential amplifier 62 at a value that is sufficient to continue to keep differential amplifier 62 turned off. How long differential amplifier 62 remains off is dependent on the charge period for capacitor 60, which may specifically be dependent on the settings of the combination of resistor 66 and capacitor 60. When capacitor 60 has sufficiently charged, the output of differential amplifier 62 may be activated again to allow power module 30 to pursue normal operation. Resistor 70 may be used to define the base current from switch 38. Switch 38 is shown to be a semiconductor transistor switch (e.g., a bipolar junction transistor). However, other circuitry for implementing a switch may also be used. Advantages of such a system include providing a convenient and simple trigger for locked rotor protection and a mechanism for preventing a temperature protected FET from restarting too quickly after the FET is shut down by its temperature protection circuitry. Thus, an entirely analog circuit implementation of a power module, which may be even be a "dummy power module," may be provided for a system for powering a motor. If desired, some parts of FIG. 2 may be implemented with digital circuit components.

The power module may be implemented with a standard MOSFET for supplying a drive current to a motor. For example, with reference now to FIG. 3, power module 80 may be operably coupled to motor 82 to power motor 82 to operate. Power module 80 is the same as power module 30 of FIG. 2 except for certain differences. The differences are that standard MOSFET 72 is being used for the current source (rather than temperature protected FET 42 of FIG. 2), new diodes 76 are incorporated into the circuit for protection purposes, and current measuring circuitry 74 is added (voltage dividing circuitry 46 of FIG. 2 is removed). Aside from these differences, the description above in connection with FIG. 2 also applies here in connection with FIG. 3.

Since MOSFET 72 does not have integrated temperature protection, an over current condition at MOSFET 72 is used as an electrical condition that will trigger the locked rotor protection circuitry to stop an input signal from flowing to MOSFET 72. Current measuring circuit 74, which may include a resistor to measure current, may be connected to the source terminal of MOSFET 72 to provide a signal indicative of the current flowing through the source terminal. The measured current may be examined to determine whether MOSFET 72 is experiencing an over-current condition (e.g., currents that are outside of the desired—data sheet—specified currents of MOSFET 72). An over-current condition may be caused as a result of and may indicate a locked rotor condition. Resistor 78 may be coupled to measuring circuit 72 to generate a voltage that is indicative of the current of interest. Voltage divider 84 may be connected to a pole of motor 82 that is opposite to the pole through which MOSFET 72 supplies a current to motor 82. The difference in voltage between the output of voltage divider 84 and resistor 78 may be used to identify the existence of an electrical condition, which in this case, would be an over-current condition. Timer circuitry 86 may be configured to detect the over-current condition based on outputs from voltage divider 84 and resistor 78. The content and operation of timer circuitry 86 is also shown and described in connection with FIG. 2. Timer circuitry 86 stops the flow of the DC input signal in power module 80 to stop MOSFET 72 from operating.

Diodes 76, which are a zener diode and a regular diode, are connected in series in opposing directions across the gate and drain of MOSFET 72. When timer circuitry 86 stops the flow of the input signal through switch 88, the current flow from switch 76 to MOSFET 72 stops, but as a result of the shut down, rotor inductance increases the voltage across MOSFET 72. To open a new path for current flow, a reverse current begins to flow through diodes 76 into MOSFET 72 until MOSFET 72 dissipates existing magnetic energy of motor 82. Thus analog circuit components may be implemented to provide a "dummy power module" that uses an over-current condition to identify a locked rotor condition and includes protection circuitry for handling latch-back inductances that may be caused by a shut down of the current source when a locked rotor condition is detected. The voltage marked as $V_{DD}$ is illustratively described below.

If desired, analog circuitry may be implemented in a power module to establish a control loop with a motor that is driven by the power module. For example with reference now to FIG. 4, linear power module 100 may include power supply filter circuit 102, signal conversion circuit 104, and locked-rotor-protected driver circuitry 106. Locked-rotor-protected driver circuitry 106 is shown to include locked rotor protection circuitry. Power supply filter circuit 102, signal conversion circuit 104, and driver circuitry 106 may be assembled together in a discrete structure of a linear power module. If desired, filter circuit 102, conversion circuit 104, or both may be positioned outside of the linear power module.

Figure 3:
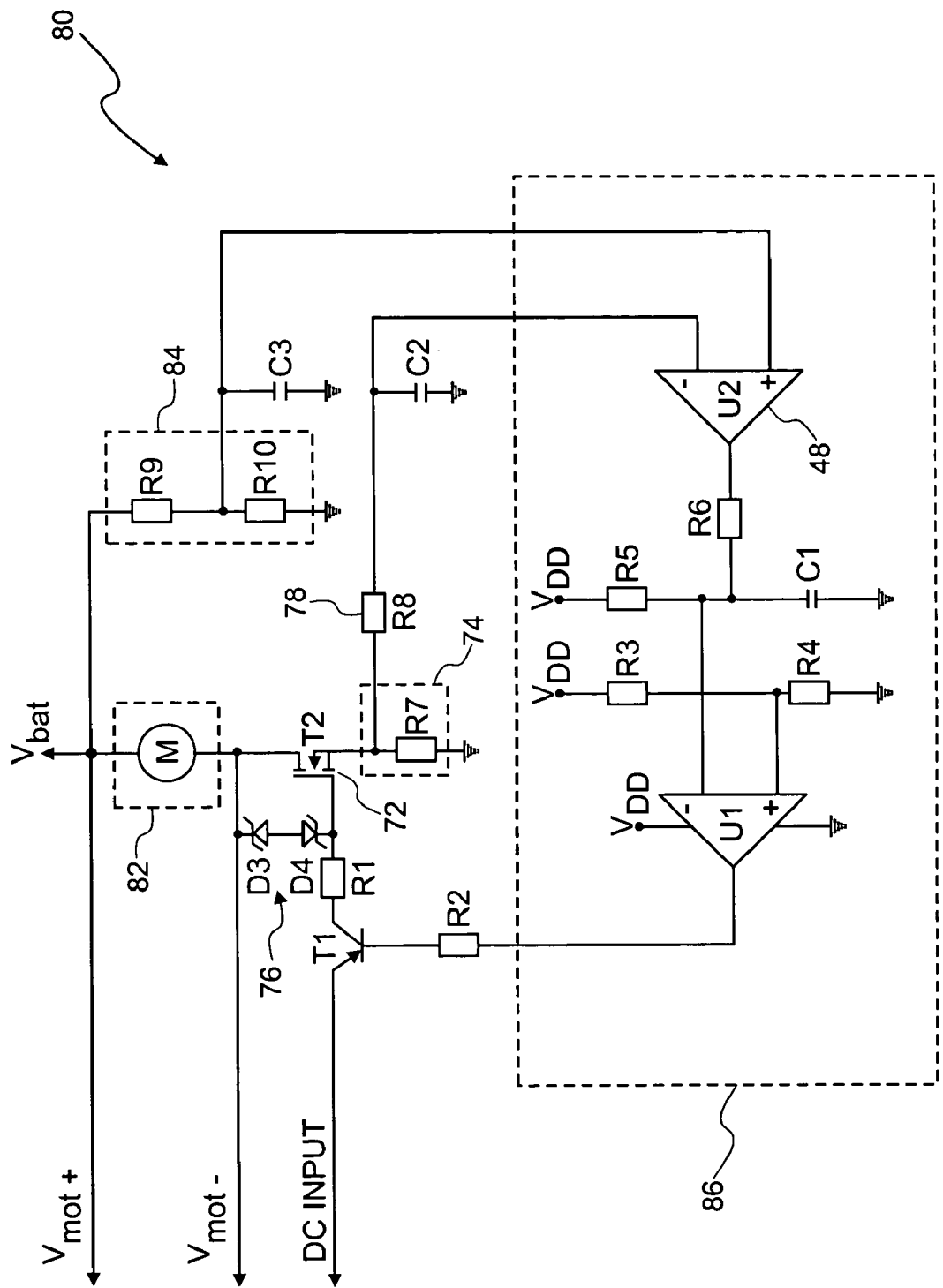
FIG. 3 is a circuit diagram of an illustrative power module that includes a standard MOSFET for a current source in accordance with one embodiment of the invention.
Figure 4:
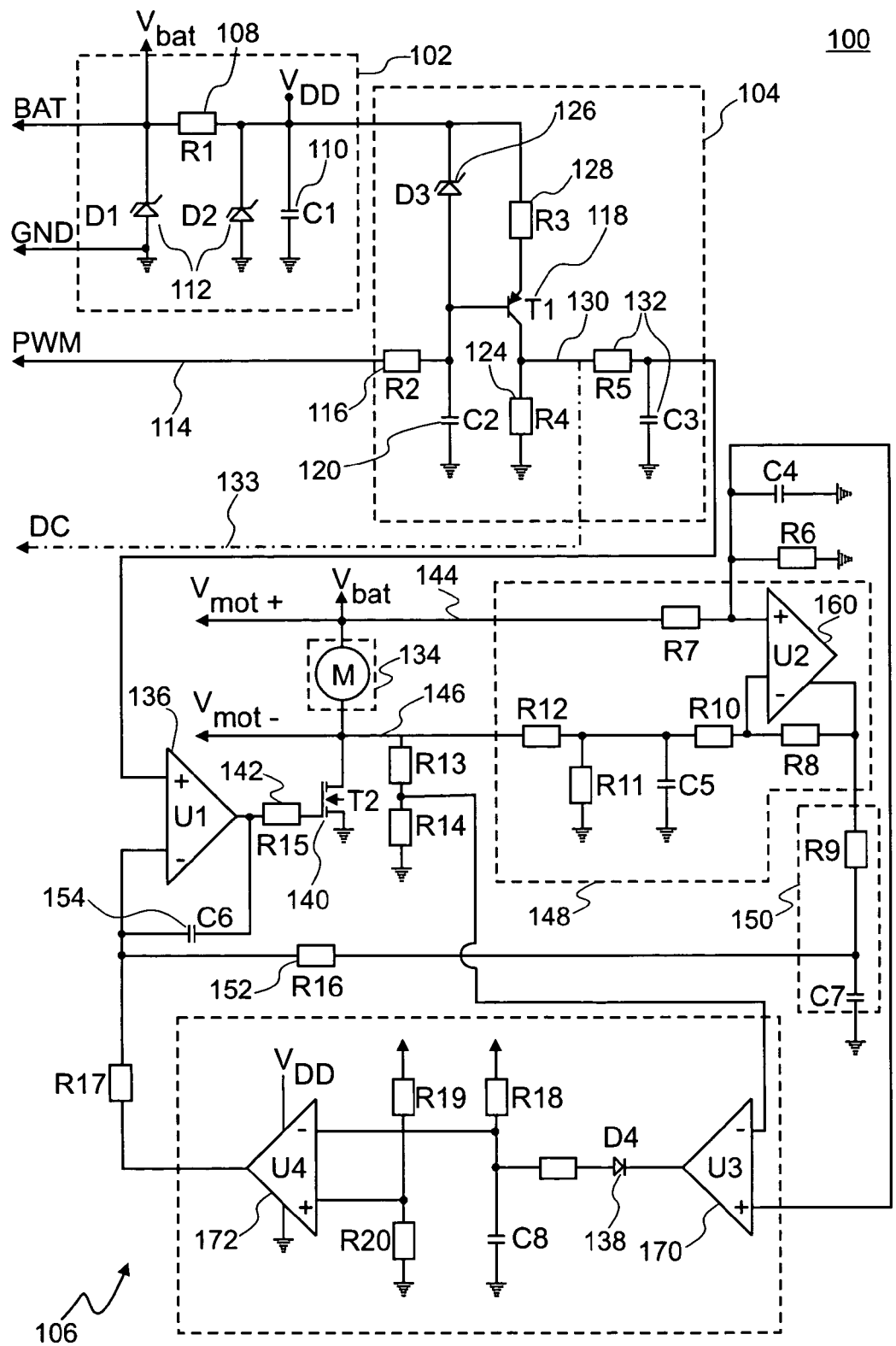
FIG. 4 is a circuit diagram of an illustrative motor control circuitry that includes an analog control loop in accordance with one embodiment of the present invention.

The voltage marked as $V_{DD}$ in FIGS. 2-4 may be a filtered output of a battery (e.g., car battery). One embodiment for providing $V_{DD}$ is illustratively shown in FIG. 4 as power supply filter circuit 102. The filter circuit 102 may include a low pass filter using the combination of resistor 108 and capacitor 110. Zener diodes 112 may be used to bypass transient voltage above a specified level. Voltages marked as $V_{bat}$ indicate the system battery voltage (e.g., the current battery voltage).

Signal conversion circuit 104 may be implemented to convert a PWM control or input signal to a DC input signal. Conversion circuit 104 may be provided with the PWM signal on line 114. Resistor 116, switch 118 (e.g., a switch amplifier such as a bipolar transistor), capacitor 120, resistor 128, resistor 124, and low pass filter 132 may be arranged to generate a DC signal in response to a PWM signal on line 114. Resistor 116 and capacitor 120 control the base current of switch 118, which depending on the width of the pulses will result in voltage pulses of the same width on resistor 124. Low pass filter 132 produces a DC signal that is proportional to the pulse width. In addition, resistor 128, diode 126, and resistor 124 may be selected to provide a different scale of DC voltage signal on line 130. The different scale DC voltage signals may represent the various discrete (or continuous) speed selections that are available to the user and are represented by the PWM signal. Zener diode 126 is used as a part of current source made of diode 126, bipolar transistor 118 and resistor 128. Resistor-capacitor combination 132 is a low pass filter.

Signal line 133 that is connected to the emitter output of switch 118 may optionally be implemented to carry a separate DC control signal that is used to further adjust the DC output of switch 118. Signal line 133 may carry a signal that is representative of a user selection. Alternatively, in some instances linear power module 100 may not have a PWM signal input (e.g., may be without the conversion circuitry 128, 118, 124, 120, and 116), and may receive an input signal that is a DC input signal that is only on line 133.

Locked rotor protected driver circuitry 106 is the same as the circuitry shown for driver circuitry 36 and locked-rotor protection circuitry 34 of FIG. 2 with some variations. Mainly, locked-rotor-protected driver 106 circuitry includes analog circuitry components that establish a control loop with motor 134. Another variation is that switch 38 of FIG. 2 is now implemented using operational amplifier 136. A further variation comprises the inclusion of diode 138 to provide an "open collector switch" which is also used in previous embodiments using different circuitry. In FIG. 2, differential amplifiers 48 and 62 are for example comparators that are part of a packaged integrated circuit (e.g., an IC chip that provides a set of comparators) and have open collector outputs. In FIG. 4, amplifiers 136 and 160 may be operational amplifiers and if desired, operational amplifiers may also be used for amplifiers 170 and 172 in the timer circuitry. This may provide a cost saving measure by providing the opportunity to use a packaged IC chip of four or more operational amplifiers for driver circuitry 160. In order to have an "open collector switch" on amplifier, diode 138 is needed. Operational amplifiers as opposed to differential amplifiers may also be used in FIGS. 2 and 3. Other circuitry elements are the same. For example, current source 140 may be the same current source 42 of FIG. 2, which is a temperature protected current source.

A control loop may be established with motor 134 using substantially only (e.g., only) analog circuit components. The control loop may be used to appropriately respond to undesirable voltage variations that are caused due to fluctuations in the battery voltage. The power supply in an automobile environment (e.g., the car battery) typically delivers a battery voltage that has undesirable fluctuations due to the electrical and mechanical environment in which it operates. A control loop may be established via amplifier 136, resistor 142, current source 140, signal lines 144 and 146 positioned across motor 134, differential amplifier circuitry 148, low pass filter 150, resistor 152, and feedback capacitor 154. For simplicity, what is shown in circuitry 148 is collectively being referred to as differential amplifier circuitry 148 because the primary function of that circuit is to operate as a differential amplifier. As shown, circuitry 148 includes a voltage divider (R11 and R12) and signal filter (R10 and C5). Circuitry 148 may also includes a resistor that serves the dual purpose of working as part of a voltage divider for the locked protection circuitry. Circuitry 148 also include a feedback resistor connected to one of the input terminals of operational amplifier 160. When operating, amplifier 136, capacitor 154, and resistor 152 form what is known as an integration circuit. Together, the integration circuitry, the signals on lines 144 and 146, differential amplifier circuitry 148, and low-pass filter circuit 150 may establish a desired control loop for regulating the voltage across the motor 134.

Differential amplifier circuitry 148 may be implemented to detect when the voltage across motor 134 has fluctuated outside a particular range to battery voltage levels. In response to a fluctuation that is outside the acceptable range, an output signal may be generated by differential amplifier circuitry 146, which is filtered by low filter 150, and feed to the integration circuitry (differential amplifier 136, capacitor 154, and resistor 152). The integration circuitry may generally be implemented in the control loop to smoothly adjust the input signal to current source 140. The feedback adjustment then allows motor 134 to maintain a linear relationship with respect to the DC signal from conversion circuitry 104 even though for example the upper rail voltage of motor 134 has changed. Thus, linear power module 100 may be configured with analog circuitry that can establish a control loop with motor 134. If desired, in some instances, digital components may also be used in implementing power module 100. If desired, linear power module 100 may be implemented without locked rotor protection circuitry.

In some of the embodiments illustratively shown herein, connections between certain circuit elements are shown to be direct connections. This, however, is not to indicate that there can be no intermediary connections.

In some embodiments, a power module may include a mechanical structure that houses the circuitry that is illustratively described herein. The structure may then allow the module to be packaged and distributed so that it may conveniently be inserted (e.g., using package pins) as part of a system for operating an electric motor.

It is to be understood that there may be embodiments in which a control loop is established with a motor using a combination of circuitry in the control head and the power module.

Although there is some commonality in the circuitry in the circuits of FIGS. 2-4, the commonality is not necessarily intended to indicate that common circuit elements in different figures have the operation values (e.g., same resistance, same capacitance, etc.).

Thus, linear power modules, and system and methods that use linear power modules may be implemented that benefit from the advantages of analog circuit components.

It is to be understood that the invention is not to be limited to the exact configuration as illustrated and described herein. Accordingly, all expedient modifications readily attainable by one of ordinary skill in the art from the disclosure set forth herein, or by routine experimentation there from, are deemed to be within the spirit and scope of the invention as defined by the appended claims.

What is claimed is:

1. A variable speed, electric motor power module comprising:
    driver circuitry that is configured to receive a variable input signal and comprises:
        a voltage-controlled current source for driving a motor responsive to variations in the input signal; and
        temperature protection circuitry arranged to protect the voltage-controlled current source from operating when the current source has a temperature above a certain thermal shut down temperature; and
    locked-rotor protection circuitry comprising analog circuit components that are configured in an arrangement that blocks the input signal to the driver circuitry for a set period of time in response to an electrical condition that is caused as a result of a locked rotor condition in the motor, wherein the electrical condition is a reverse voltage spike and the locked-rotor protection circuitry is configured to be triggered by the reverse voltage spike to prevent the driver circuitry from operating.

2. The power module of claim 1 wherein the locked rotor protection circuitry is configured to block the input signal in response to the electrical condition when the electrical condition is one that is caused as a result of the temperature protection circuitry shutting down the current source.

3. The power module of claim 1 wherein the voltage controlled current source is a discrete semiconductor circuit component within which the temperature protection circuitry is integrated.

4. The power module of claim wherein the driver circuitry includes an auto-protected power semiconductor device that contains the voltage-controlled current source and the thermal protection circuitry for thermal protection of the current source integrated therein.

5. The power module of claim 4 wherein the auto-protected power semiconductor device is an auto-protected metal oxide semiconductor field effect transistor.

6. The power module of claim 5 wherein the auto-protected metal oxide-semiconductor field effect transistor is a fully autoprotected power MOSFET.

7. The power module of claim 5 wherein the auto-protected metal oxide-semiconductor field effect transistor is a temperature protected FET.

8. The power module of claim wherein the current source and the temperature protection circuitry are arranged to have the current source operate when the temperature of the current source is below the specified thermal shutdown temperature following a shut down of the current source for being above the specified thermal shutdown temperature.

9. The power module of claim 1 wherein the locked-rotor protection circuitry comprises a resistor-capacitor combination, and the locked-rotor protection circuitry is configured to have the set period of time be based on a discharge time of the capacitor in the resistor-capacitor combination.

10. The power module of claim 1 wherein the input signal is a DC voltage signal that the driver circuitry is arranged to receive to operate the motor.

11. The power module of claim 1 wherein the input signal is a pulse-width-modulated voltage signal that the power module is configured to receive to operate the motor.

12. The power module of claim 1 wherein the locked-rotor protection circuitry includes a differential amplifier that is configured to have an output signal in response to the electrical condition.

13. A variable speed, electric motor power module comprising:
    driver circuitry that is configured to receive a variable input signal and comprises a voltage-controlled current source for driving a motor responsive to variations in the input signal; and
    locked-rotor protection circuitry comprising analog circuit components that are configured in an arrangement that blocks the input signal to the driver circuitry for a set period of time in response to an electrical condition that is caused as a result of a locked rotor condition in the motor wherein the driver circuitry comprises thermal protection circuitry arranged to protect the voltage controlled current source from operating when the current source has a temperature above a specified thermal shut down temperature, and the locked-rotor protection circuitry is configured to include a differential amplifier that is configured to have an output signal in response to the electrical condition and to have the differential amplifier generate the output signal in response to a reverse voltage spike across the current source.

14. The power module of claim 12 wherein the output signal charges a capacitor that is used to set the period for preventing the driver circuitry from operating.

15. The power module of claim 14 wherein the locked-rotor protection circuitry includes another differential amplifier that is responsive to the capacitor discharging and is coupled to the driver circuitry to provide control when the input signal is blocked.

16. The power module of claim 1 wherein the driver circuitry comprises a switch that is configured to pass the input signal to the current source and is configured to receive a control signal from the locked-rotor protection circuitry that controls the switch.

17. The power module of claim 1 wherein the power module is configured to operate without routing signals through an application specific integrated circuit.

18. The power module of claim 1 wherein the power module is configured to operate without digital logic components.

19. A variable speed, electric motor-driven HVAC system comprising:
a control head that is responsive to user motor speed selection and that is configured to form a control loop with a motor that provides a feedback signal to the control head and that is further configured to generate a DC signal based on the user motor speed selection and the feedback signal; and
the power module of claim 1 arranged to receive the DC signal to be the input signal of the driver circuitry.

20. The system of claim 19 wherein the driver circuitry is configured to operate without routing signals through an application specific integrated circuit.

21. The system of claim 19 wherein the power module is configured to operate without digital logic components.

22. The system of claim 19 wherein the power module is remotely located from the control head.

23. The system of claim 19 wherein the power module is configured and adapted only for converting the DC signal into a current for driving the motor.

24. The power module of claim 1 further comprising control loop circuitry that is configured to establish a control loop with the motor.

25. The power module of claim 1 further comprising feedback circuitry that receives a feedback signal from the motor that indicates any undesirable voltage fluctuation across the motor and includes circuitry for adjusting a current supplied by the current source to the motor in response to the feedback signal.

26. A variable speed, electric motor power module comprising:
driver circuitry that is configured to receive a variable input signal and comprises a voltage-controlled current source for driving a motor responsive to variations in the input signal;
locked-rotor protection circuitry comprising analog circuit components that are configured in an arrangement that blocks the input signal to the driver circuitry for a set period of time in response to an electrical condition that is caused as a result of a locked rotor condition in the motor; and
control loop circuitry implemented using analog circuitry to establish a control loop with the motor.

27. The power module of claim 26 wherein the driver circuitry comprises a temperature protected power semiconductor device for the current source.

28. The power module of claim 26 wherein the control loop circuitry comprises differential amplifier circuitry that compares two signals that are representative of a voltage across the motor.

29. The power module of claim 28 wherein the control loop circuitry further comprises a low pass filter for filtering the output of the differential amplifier circuitry.

30. The power module of claim 29 wherein the control loop circuitry further comprises an integration circuit that receives the filtered output signal from the differential amplifier circuitry.

31. The power module of claim 30 wherein the integration circuit is connected to the locked rotor protection circuitry.

32. A method of supplying power to the variable speed, electric motor power module of claim 1, which comprises:
providing in the power module, driver circuitry that is configured to receive a variable input signal and comprises a voltage-controlled current source for driving a motor responsive to variations in the input signal; and
protecting from locked rotor conditions by arranging analog circuitry that is configured to block the input signal to the driver circuitry for a set period of time in response to an electrical condition that is caused as a result of a locked rotor condition in the motor.

33. The method of claim 32 wherein the providing comprises integrating temperature protection circuitry with the current source to protect the voltage controlled current source from operating when the current source has a temperature above a certain thermal shut down temperature.

34. The method of claim 32 wherein the providing comprises operating the power module without routing signals through application specific integrated circuit.

35. A method for operating a variable speed, electric motor-driven HVAC system comprising:
providing a control head that is responsive to user motor speed selection and that is configured to form a control loop with a motor that provides a feedback signal to the control head and that is further configured to generate a DC signal based on the user motor speed selection and the feedback signal; and
the method of claim 32, wherein the DC signal is the input signal of the driver circuitry.

* * * * *

UNITED STATES PATENT AND TRADEMARK OFFICE
CERTIFICATE OF CORRECTION

PATENT NO.         : 7,542,251 B2
APPLICATION NO. : 10/435694
DATED              : June 2, 2009
INVENTOR(S)       : Mladen Ivankovic It is certified that error appears in the above-identified patent and that said Letters Patent is hereby corrected as shown below:

Column 12, claim 8, line 13: Please correct the claim to include a dependent claim reference to claim 1, as follows:

--8. The power module of claim 1 wherein the current source and the temperature protection circuitry are arranged to have the current source operate when the temperature of the current source is below the specified thermal shutdown temperature following a shut down of the current source for being above the specified thermal shutdown temperature.--

Column 12, claim 13, line 45: Please add a --,-- after "motor".

Column 13, claim 19, line 9: Please change "1oop" to --loop--.

Signed and Sealed this

First Day of September, 2009

David J. Kappos
*Director of the United States Patent and Trademark Office*